(12) United States Patent
Chen et al.

(10) Patent No.: US 12,157,339 B2
(45) Date of Patent: Dec. 3, 2024

(54) STEERING WHEEL SUSPENSION STRUCTURE OF OMNIDIRECTIONAL MOBILE ROBOT

(71) Applicant: Beihang University, Beijing (CN)

(72) Inventors: Juan Chen, Beijing (CN); Jingkun Wei, Beijing (CN); Zhaoqin Peng, Beijing (CN); Min Yang, Beijing (CN); Qingzhen Zhang, Beijing (CN); Changlin Wu, Beijing (CN)

(73) Assignee: Beihang University (CN)

( * ) Notice: Subject to any disclaimer, the term of this patent is extended or adjusted under 35 U.S.C. 154(b) by 0 days.

(21) Appl. No.: 18/127,692

(22) Filed: Mar. 29, 2023

(65) Prior Publication Data
US 2023/0311602 A1    Oct. 5, 2023

(30) Foreign Application Priority Data

Mar. 29, 2022   (CN) .......................... 202210341620.6

(51) Int. Cl.
*B60G 11/10*   (2006.01)
*B25J 5/00*    (2006.01)

(52) U.S. Cl.
CPC ............... *B60G 11/10* (2013.01); *B25J 5/007* (2013.01)

(58) Field of Classification Search
CPC ...... B62D 7/023; B60G 2202/11; B60G 11/10
See application file for complete search history.

(56) References Cited

U.S. PATENT DOCUMENTS

| 1,482,121 A | * | 1/1924 | Errecaborde | B62D 7/023 280/124.121 |
| 1,520,046 A | * | 12/1924 | Wishard | B62D 7/023 280/108 |

(Continued)

FOREIGN PATENT DOCUMENTS

| CN | 108081895 A | 5/2018 |
| CN | 209666763 U | 11/2019 |

(Continued)

OTHER PUBLICATIONS

Xiaochun He, et al., Research on Design of Rudder Suspension, Science and Technology Vision, 2013, pp. 113, vol. 32.

*Primary Examiner* — Paul N Dickson
*Assistant Examiner* — Maxwell L Meshaka

(57) ABSTRACT

A steering wheel suspension structure of an omnidirectional mobile robot includes a steering wheel connecting ring, a plurality of leaf spring connecting beams and a chassis mounting section. The steering wheel suspension structure is an integrated plate structure. The steering wheel connecting ring is connected with a steering wheel, and the chassis mounting section is connected with a robot chassis. The leaf spring connecting beam is connected with the steering wheel connecting ring and the chassis mounting section, and the leaf spring connecting beam is used as the main component of suspension deformation. The suspension structure is simple, easy to install, light in weight, less in space, and highly integrated with the steering wheel assembly. When the suspension is deformed by the force, it weakens the radial force and only has the displacement and force in the vertical direction, thus ensuring the handling performance of the chassis.

15 Claims, 3 Drawing Sheets

(56) References Cited

U.S. PATENT DOCUMENTS

| | | | | | |
|---|---|---|---|---|---|
| 1,565,385 | A | * | 12/1925 | Obrecht | B60G 11/10 267/52 |
| 1,605,217 | A | * | 11/1926 | Clark | B62D 7/023 280/124.121 |
| 5,465,997 | A | * | 11/1995 | Heitzmann | B60G 11/24 267/257 |
| 8,662,234 | B2 | * | 3/2014 | Roeder | B62D 5/0418 180/6.44 |
| 8,727,362 | B2 | * | 5/2014 | Heimann | B60G 11/10 280/124.134 |
| 2011/0048834 | A1 | * | 3/2011 | Roeder | B62D 7/023 180/252 |
| 2011/0259997 | A1 | | 10/2011 | Marechal | |
| 2012/0313339 | A1 | | 12/2012 | Heimann et al. | |
| 2023/0311602 | A1 | * | 10/2023 | Chen | B62D 7/023 280/124.17 |
| 2023/0373559 | A1 | * | 11/2023 | Chen | B62D 5/0418 |

FOREIGN PATENT DOCUMENTS

| | | | | |
|---|---|---|---|---|
| CN | 209667188 U | | 11/2019 | |
| CN | 111059187 A | * | 4/2020 | ............. B60G 11/02 |
| CN | 211809955 U | | 10/2020 | |
| CN | 114537068 A | * | 5/2022 | ............. B25J 5/007 |
| DE | 202010001060 U1 | * | 5/2010 | ............. B62D 7/023 |
| EP | 2284117 A2 | * | 2/2011 | ............. B62D 7/023 |
| WO | 2015074819 A1 | | 5/2015 | |

* cited by examiner

STEERING WHEEL SUSPENSION STRUCTURE OF OMNIDIRECTIONAL MOBILE ROBOT

CROSS REFERENCE TO THE RELATED APPLICATIONS

This application is based upon and claims priority to Chinese Patent Application No. 202210341620.6, filed on Mar. 29, 2022, the entire contents of which are incorporated herein by reference.

TECHNICAL FIELD

The invention belongs to the field of chassis suspension of a mobile robot, in particular to a suspension structure of a steering wheel.

BACKGROUND

In the omnidirectional mobile robot chassis, the steering wheel can meet the omnidirectional movement of the robot chassis, and also has high speed and acceleration, which is outstanding in robot competitions.

Whether it is the robot competition field or the daily road surface, the seemingly flat ground is actually uneven, with more or less pits or bumps. Therefore, when the wheel passes through the uneven position, it will cause vibration. Especially for the robot chassis with more than four wheels, when passing through these pits or protrusions, it may cause 1-2 wheels to leave the ground, and the loss of friction force is not enough to grasp the ground, which will cause the chassis to shake, reduce the load energy, and reduce the handling performance, and the robot will lose control.

In the existing robot design schemes, the chassis flexible design is widely used to realize the wheel suspension function. Through the torsion deformation of the flexible chassis, the four-wheel grip during movement is guaranteed. However, the problem is also obvious: the integration is not high, and the stiffness is poor; in addition, the flexible steering wheel suspension with spring structure design leads to complex assembly process, which also takes up a lot of design load and layout space of the robot.

SUMMARY

The invention provides a steering wheel suspension structure of omnidirectional mobile robot, which provides a simple independent suspension scheme for the steering wheel module to solve the problems of insufficient wheel grip ability and vibration interference when the steering wheel chassis runs on uneven roads.

A steering wheel suspension structure of an omnidirectional mobile robot is composed of a steering wheel connecting ring, a plurality of leaf spring connecting beams and a chassis mounting section, which is an integrated plate structure. The shape of the steering wheel connecting ring matches the steering wheel and is connected with the steering wheel through a detachable fixing method. The detachable fixing mode makes the suspension structure closely fit with the steering wheel, presenting an integrated layout, and the disassembly and assembly is fast and convenient.

The multiple leaf spring connecting beams are in the form of strip plates, extending outward from the center of the suspension structure, and generate flexible deformation when stressed to provide vertical displacement for the steering wheel; a plurality of leaf spring connecting beams are symmetrically and uniformly distributed on the steering wheel mounting ring, which produces symmetrical constraints on the steering wheel, balances the radial force, and disperses the concentrated stress and deformation generated by the steering wheel suspension, so as to meet the limited suspension stroke index of vertical movement under standard load. During the operation of the steering wheel, when moving up and down within the limited range of the suspension, the steering wheel is always vertical to the ground, eliminating the oblique and horizontal radial deviation, thus ensuring the control reliability of the robot chassis.

The chassis mounting section fixes the suspension structure on the chassis through a detachable fixing method; the chassis mounting section is located at the outer end of the leaf spring connecting beam, and its quantity corresponds to the leaf spring connecting beam.

Mechanical design of steering wheel leaf spring suspension structure:

Determine the installation position of the steering wheel according to the shape of the chassis, set the center distance between adjacent steering wheels as S, determine the suspension stroke under the design standard load according to the flatness of the ground, set the undulation per meter of the plane as k, set the chassis suspension stroke as l, then the maximum suspension stroke $l_{max} \geq ks$;

The mass of the robot is M, the gravity is Mg, and the number of steering wheels is N. Considering the appropriate safety margin, the load force distributed to each steering wheel is $F=1.25$ Mg/N; set the number of leaf spring connecting plates suspended by a single steering wheel as n, and the load of each leaf spring beam connecting plate $P=F/n=1.25$ Mg/(Nn).

Suppose that the leaf spring connecting beam with square section has m layers, length L, width b and thickness h, then the section inertia moment of the single-layer beam $I=b(h/m)^3/12$, and the force of the single-layer beam is $p=P/m$; The leaf spring beam is a cantilever beam, and the elastic modulus of the leaf spring material is E, then the overall deflection of the leaf spring $Y=pL^3/(3EI)=4P(m^2)(L^3)/(Ebh^3)$, so that $Y=l_{max}=kS$. The simulation is verified by finite element analysis software.

In addition, the steering wheel suspension structure of the omnidirectional mobile robot can also adopt a split structure. The leaf spring connecting beam is separated from the steering wheel connecting ring and connected by bolts or bonding.

In addition, the steering wheel suspension structure of the omnidirectional mobile robot can also be made of carbon fiber, aluminum alloy, steel, titanium alloy, etc.

In addition, the shape of the steering wheel suspension structure of the omnidirectional mobile robot can also be determined according to the shape of the steering wheel by using round, square, triangle, pentagon, hexagon, etc.

In addition, the steering wheel suspension structure of the omnidirectional mobile robot and the shape of the leaf spring connecting beam can also adopt the long isosceles trapezoid, hourglass, spindle, Y, etc.

In addition, for the steering wheel suspension structure of the omnidirectional mobile robot, the number of layers of the leaf spring connecting beam can be single or multiple.

In addition, the number of leaf spring connecting beams of the steering wheel suspension structure of the omnidirectional mobile robot is not less than 3. The stability of less than 3 leaf spring connecting beams is insufficient, which will cause shaking and overturning. Each leaf spring connecting beam is symmetrically arranged on the steering wheel connecting ring, and the symmetrical constraint makes the load and stress uniform.

The technical scheme of the invention includes: the number and position of the mounting holes of the chassis mounting section are unlimited, and one or more mounting holes can be arranged at the end of the leaf spring connecting beam, but the hole position needs to be symmetrical along the central line axis of the leaf spring connecting beam, and each chassis mounting section needs to be identical.

Compared with the prior art, the invention has the following advantages: 1. The integrated independent suspension technology is adopted, with simple structure, convenient installation, light weight, less space, and high integration with the steering wheel assembly; 2. When the suspension force is deformed, the radial force is weakened, the vertical force of the steering wheel is maintained, and only the displacement and force in the vertical direction are maintained, so as to ensure the operating performance of the chassis. 3. The parameters such as material, shape, length, thickness and number of layers of the leaf spring connecting beam are constrained and calculated by the suspension stiffness and suspension deformation, and verified by the finite element analysis software. The multilayer laminated spring can produce greater deformation under the same force and the same total thickness of the spring. 4. The steering wheel suspension structure has strong personalized design characteristics, and can be designed according to the requirements of robot chassis structure, steering wheel structure, load and suspension.

In the figures: 1 is the steering wheel suspension structure of the omnidirectional mobile robot, 1-1 is the chassis mounting section, 1-2 is the leaf spring connecting beam, 1-3 is the steering wheel connecting ring, 1-3-1 is the steering wheel connecting screw hole, 1-3-2 is the steering wheel pin positioning hole; 2 is chassis aluminum pipe, 2-1 is chassis connecting bolt; 3 is the steering wheel.

DETAILED DESCRIPTION OF THE EMBODIMENTS

The present invention is further described in detail with reference to the attached drawings and specific embodiments:

The invention relates to a suspension structure of the steering wheel, which is composed of the steering wheel connecting ring 1-3, a plurality of leaf spring connecting beams 1-2 and the chassis mounting section 1-2. It is an integrated plate structure, and the carbon fiber plate is used for overall cutting. The shape of the steering wheel connecting ring 1-3 matches that of the steering wheel 3, and the shape is the same as the projection shape of the steering wheel 3, which is a circular ring, and the hollow part provides space for the passage of the steering wheel 3; the steering wheel connecting ring 1-3 is connected with the steering wheel 3 through a removable fixing method. The outer circle of the steering wheel connecting ring 1-3 is used for auxiliary positioning. The two pins pass through the steering wheel pin positioning hole 1-3-2 for main positioning; the steering wheel is fixedly connected with the steering wheel 3 through six steering wheel connecting screw holes 1-3-1 evenly distributed on the steering wheel connecting ring 1-3; the detachable fixing method makes the suspension structure closely fit with the steering wheel, presenting an integrated layout, and the disassembly and assembly is fast and convenient, as shown in FIG. 1 and FIG. 2.

Figure 1:
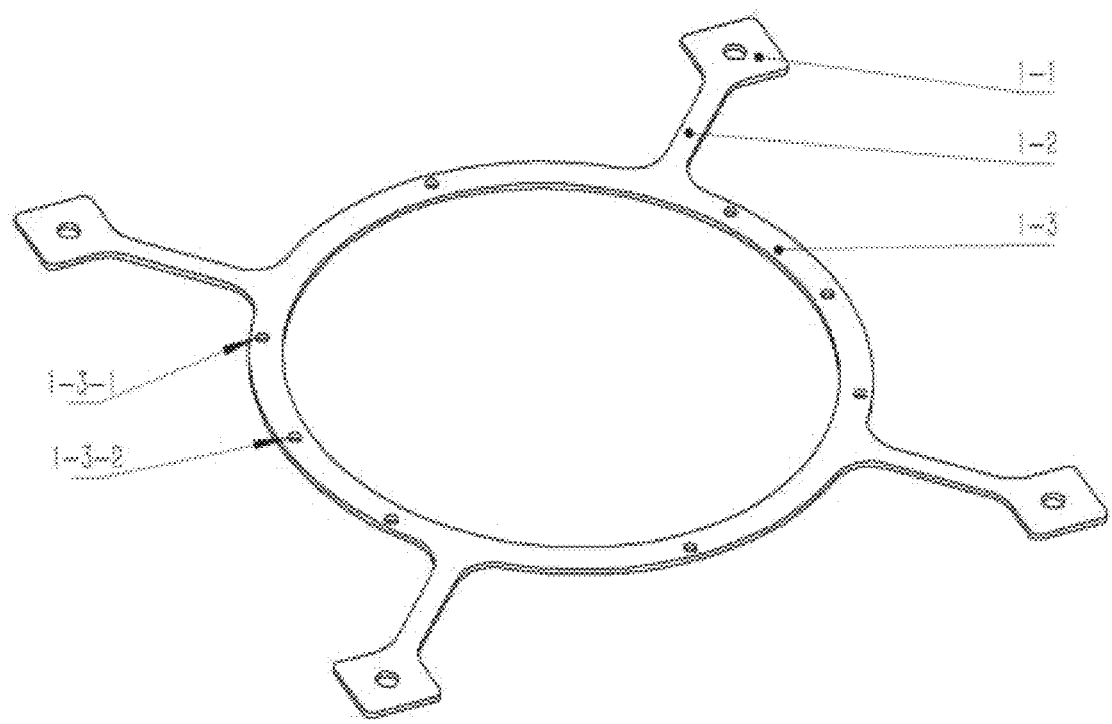
FIG. 1 is the overall picture of the steering wheel suspension structure of the omnidirectional mobile robot.
Figure 2:
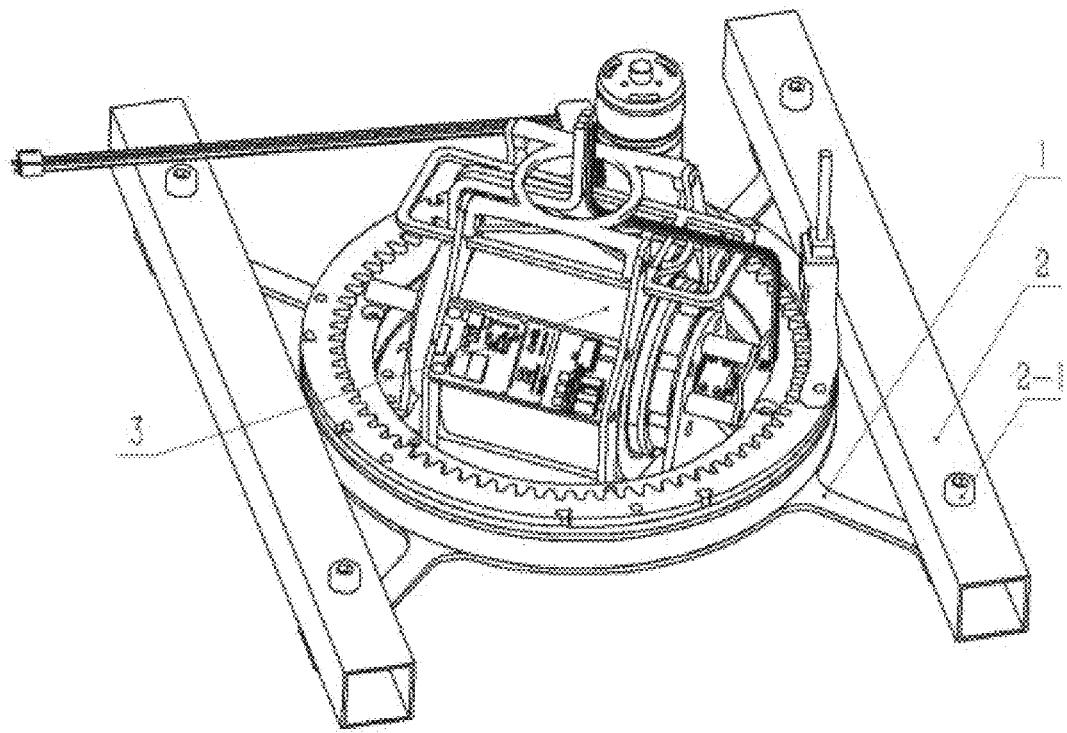
FIG. 2 is the connection diagram of the steering wheel suspension structure, steering wheel and chassis of the omnidirectional mobile robot.

The multiple leaf spring connecting beams 1-2 are in the form of long strip plates, extending outward from the center of the suspension structure, and generate flexible deformation when stressed to provide vertical displacement for the steering wheel 3; a plurality of leaf spring connecting beams 1-2 are symmetrically and uniformly distributed on the steering wheel mounting ring 1-3, extending from the four corners, generating symmetrical constraints on the steering wheel 3, balancing the radial force, and dispersing the concentrated stress deformation generated by the steering wheel suspension, so that the limited suspension stroke index of vertical movement can be met under the standard load; during the operation of the steering wheel 3, when moving up and down within the limited range of the suspension, the steering wheel 3 is always vertical to the ground, eliminating the oblique and horizontal radial offset, so as to ensure the control reliability of the robot chassis, as shown in FIG. 1 and FIG. 2.

The chassis mounting section 1-1 fixes the suspension structure on the chassis through a detachable fixing method; the chassis mounting section 1-1 is located at the outer end of the leaf spring connecting beam 1-2, and its number corresponds to the leaf spring connecting beam, which is four in this scheme; the chassis mounting section 1-1 is connected with the chassis aluminum tube 2 through the chassis connecting bolt 2-1, as shown in FIG. 1 and FIG. 2.

In this embodiment, the chassis is a square chassis structure with four steering wheels, and the center distance between adjacent steering wheels 3 is S=750 mm. The design condition of the chassis is a flat wooden floor. The ground undulation is very small, and the undulation per meter of the plane is k=0.002. Then the maximum travel of the chassis suspension kS=0.002*750=1.5 mm, and the maximum travel of the suspension I max≥1.5 mm.

The mass of the robot is M=50 kg, the gravity acceleration g is 9.81, and the number of steering wheels is N=4; in this example, if the number of leaf spring connecting beams 1-2 of a single steering wheel suspension 1 is n=4, the load on each leaf spring connecting beam 1-2 is P=1.25*50*9.81/(4*4)=38.32N.

Two leaf springs are designed for this embodiment:

The alloy leaf spring is 35 mm long, 6 mm wide, 1.5 mm thick, single layer, elastic modulus E=210 GPa; section inertia moment I=6*1.5 ^3/12=1.6875 mm^4, deflection Y=38.3*35 ^3/(3*210000*1.6875)=1.54 mm, Y≈1 max;

The carbon fiber/epoxy resin composite leaf spring is 35 mm long, 9 mm wide, 2 mm thick, single-layer, with tensile modulus of 60 GPa and compression modulus of 57.5 GPa. In order to facilitate design and calculation, the elastic modulus E=60 GPa is taken; section inertia moment I=9*2 ^3/12=6 mm^4, deflection Y=38.3*35 ^3/(3*60000*6)=1.52 mm, Y≈1 max.

Figure 3:
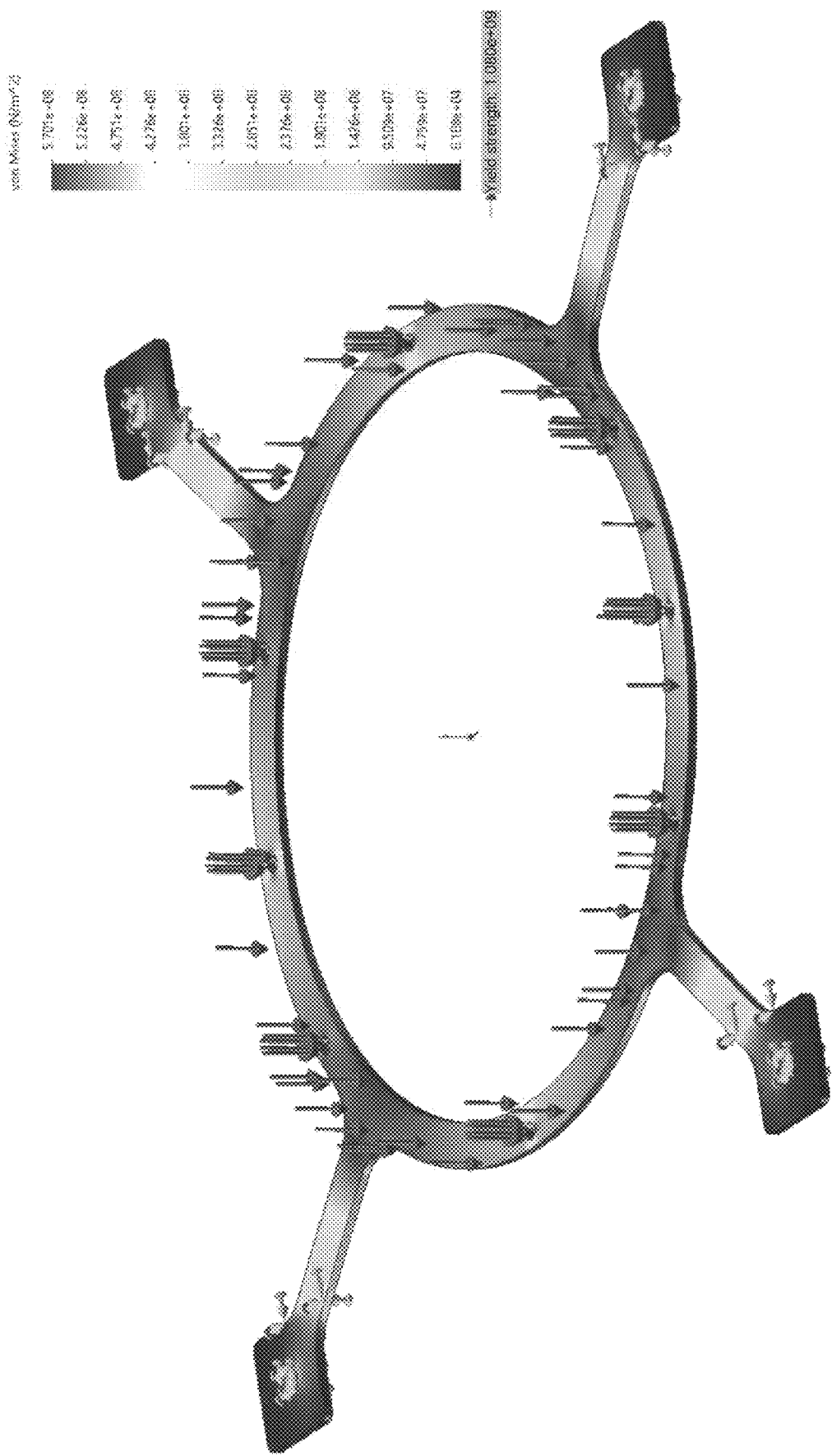
FIG. 3 is the finite element analysis diagram of the steering wheel suspension structure of the omnidirectional mobile robot.
Figure 4:
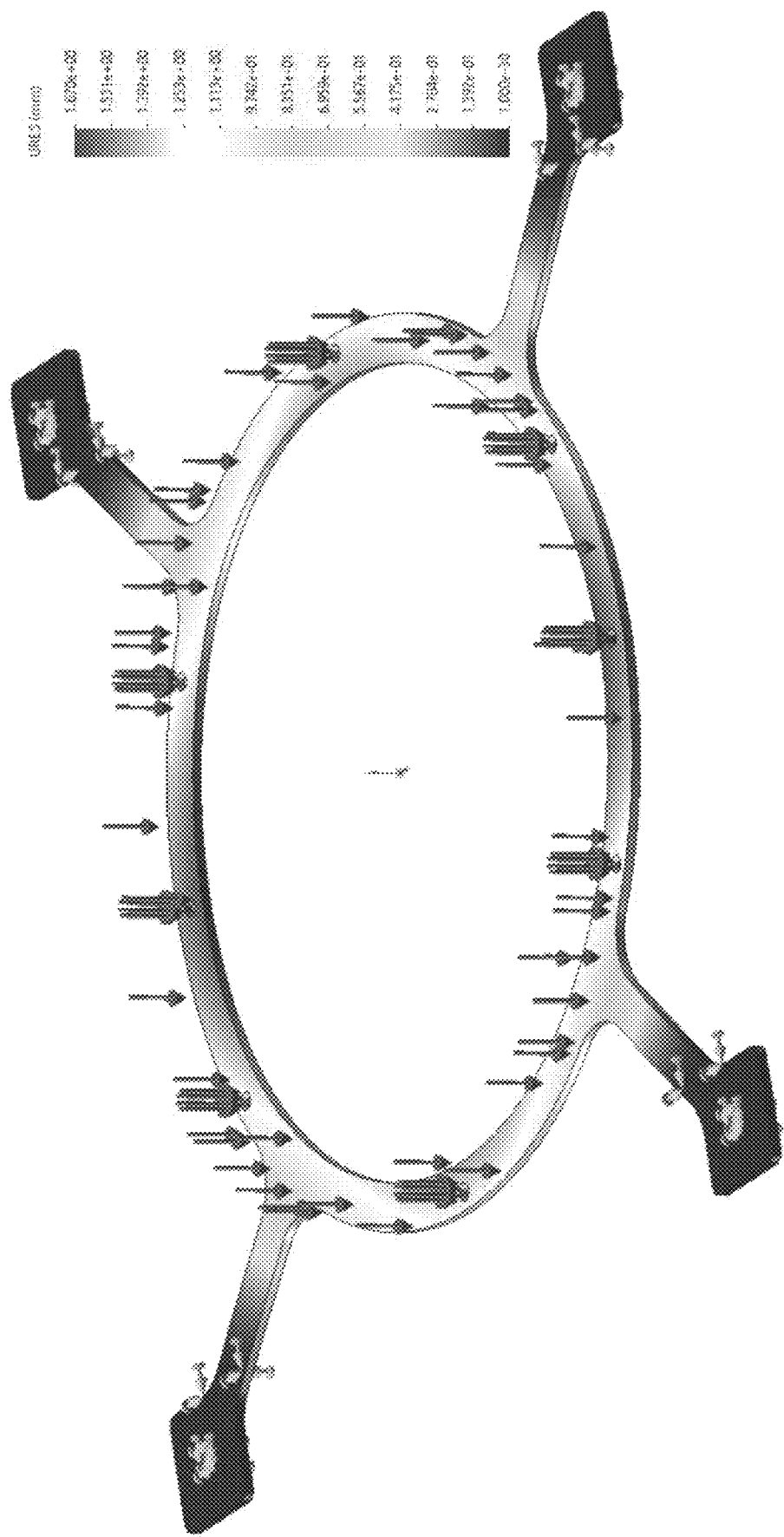
FIG. 4 is the finite element displacement diagram of the steering wheel suspension structure of the omnidirectional mobile robot.

The finite element analysis software was used to check and verify that the maximum stress was about half of the yield stress, and the suspension formation was 1.6 mm, meeting the design indexes, as shown in FIG. 3 and FIG. 4.

The embodiments of the invention are described in detail in combination with the attached drawings. However, the invention is not limited to the embodiments, and various changes can be made within the scope of knowledge possessed by ordinary technical personnel in the field without deviating from the purpose of the invention.

What is claimed is:

1. A steering wheel suspension structure of an omnidirectional mobile robot, comprising:
   a steering wheel connecting ring, wherein the steering wheel connecting ring is connected with a steering wheel;
   a plurality of leaf spring connecting beams; and
   a plurality of chassis mounting sections, wherein,
      each leaf spring connecting beam is in a shape of a strip plate, extending radially from a portion of the steering wheel connecting ring;
      each leaf spring connecting beam connects each chassis mounting section to the steering wheel connecting ring as a main part of a suspension to produce a longitudinal travel; and
      each chassis mounting section is connected with a robot chassis.

2. The steering wheel suspension structure according to claim 1, wherein a shape of the steering wheel connecting ring is matched with a shape of the steering wheel, and the shape of the steering wheel connecting ring is generally circular; and the steering wheel connecting ring is closely connected with the steering wheel through screws.

3. The steering wheel suspension structure according to claim 1, wherein each chassis mounting section fixes the steering wheel suspension structure on the robot chassis through a detachable fixing method; each chassis mounting section is located at an outer end of the corresponding leaf spring connecting beam.

4. The steering wheel suspension structure according to claim 1, wherein the plurality of leaf springs are configured to generate flexible deformation, when stressed to provide vertical displacement for the steering wheel.

5. The steering wheel suspension structure according to claim 4, wherein the number of the leaf spring connecting beams and the chassis mounting sections is greater than or equal to 3 to ensure a stability of a suspension system; and the plurality of leaf spring connecting beams are symmetrically and uniformly distributed on a steering wheel mounting ring, wherein the plurality of leaf spring connecting beams produces symmetrical constraints on the steering wheel, balances a radial force, and disperses a concentrated stress and deformation generated by a steering wheel suspension.

6. The steering wheel suspension structure according to claim 5, wherein a mechanical design of the leaf spring connecting beam is implemented as follows:
   determine an installation position of the steering wheel according to a shape of the robot chassis, set a center distance between adjacent steering wheels as S, determine a suspension stroke under a design standard load according to a flatness of a ground, set an undulation per meter of a plane as k, set a chassis suspension stroke as l, then a maximum suspension stroke I max≥ks;
   a mass of the omnidirectional mobile robot is M, a gravity is Mg, and a number of steering wheels is N; considering an appropriate safety margin, a load force distributed to each steering wheel is F=1.25 Mg/N; set a number of leaf spring connecting plates suspended by a single steering wheel as n, and a load of each leaf spring beam connecting plate P=F/n=1.25 Mg/(Nn);
   suppose that the leaf spring connecting beam with a square section has m layers, length L, width b and thickness h, then a section inertia moment of a single-layer beam I=b $(h/m)^\wedge 3/12$, and a force of the single-layer beam is p-P/m; a leaf spring beam is a cantilever beam, and an elastic modulus of a leaf spring material is E, then an overall deflection of a leaf spring Y=pL$^\wedge$3/(3EI)=4P $(m^\wedge 2)/(L^\wedge 3)/(Ebh^\wedge 3)$, so that Y=1 max=kS; and a simulation is verified by finite element analysis software.

7. The steering wheel suspension structure according to claim 1, wherein the steering wheel suspension structure is configured to be an integrated structure of a steering wheel of the omnidirectional robot, or configured to be a split structure connected by bolts or bonding with the steering wheel of the omnidirectional robot.

8. The steering wheel suspension structure according to claim 1, wherein the steering wheel suspension structure is made of carbon fiber, aluminum alloy, steel, or titanium alloy.

9. The steering wheel suspension structure according to claim 1, wherein a shape of the steering wheel suspension structure is round, square, triangular, pentagon, or hexagon, wherein the shape of the steering wheel suspension structure is determined according to a shape of the steering wheel.

10. The steering wheel suspension structure according to claim 4, wherein a shape of the leaf spring connecting beam is long isosceles trapezoid, hourglass, spindle, or Y shape.

11. The steering wheel suspension structure according to claim 4, wherein a number of layers of the leaf spring connecting beam is single or multiple.

12. The steering wheel suspension structure according to claim 4, wherein a number of holes connecting the chassis mounting section and the robot chassis is one or more; a hole position is symmetrical along a central line of the leaf spring connecting beam, and the hole position of each chassis mounting section is identical.

13. The steering wheel suspension structure according to claim 1, wherein the steering wheel suspension structure is a unibody design.

14. The steering wheel suspension structure according to claim 2, wherein,
   the steering wheel connecting ring defines an inner surface and an outer surface;
   each of the plurality of leaf spring connecting beams extend radially outwards from the outer surface of the steering wheel connecting ring;
   the leaf spring connecting beams are symmetrically and uniformly disposed around the steering wheel connecting ring; and
   each of the chassis mounting sections are disposed towards an outer end of corresponding leaf spring connecting beam.

15. The steering wheel suspension structure according to claim 1, wherein the steering wheel connecting ring, the plurality of leaf spring connecting beams and the plurality of chassis mounting sections of the steering wheel suspension structure are in a same plane.

* * * * *